US008615878B2

(12) United States Patent
Chou

(10) Patent No.: US 8,615,878 B2
(45) Date of Patent: Dec. 31, 2013

(54) METHOD FOR FABRICATING A HEAT PIPE, AND INSTRUMENT OF THE METHOD

(75) Inventor: Wei-Cheng Chou, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 13/536,566

(22) Filed: Jun. 28, 2012

(65) Prior Publication Data
US 2013/0042477 A1    Feb. 21, 2013

(30) Foreign Application Priority Data
Aug. 19, 2011   (TW) .............................. 100129692 A

(51) Int. Cl.
*B23P 6/00*    (2006.01)
(52) U.S. Cl.
USPC .................. 29/890.032; 165/104.26
(58) Field of Classification Search
USPC ................ 29/890.032; 419/5; 165/104.21; 148/909; 72/466.8; 428/543
See application file for complete search history.

(56) References Cited

U.S. PATENT DOCUMENTS

| 4,674,565 A * | 6/1987 | Beam ...................... 165/104.26 |
| 5,443,785 A * | 8/1995 | Mastalski et al. ............. 264/573 |
| 2007/0034357 A1* | 2/2007 | Hou et al. ................ 165/104.26 |

FOREIGN PATENT DOCUMENTS

TW    483997    4/2002

OTHER PUBLICATIONS

Taiwan Patent Office, Office Action, Patent Application No. 100129692, Oct. 14, 2013, Taiwan.

* cited by examiner

*Primary Examiner* — David Bryant
*Assistant Examiner* — Ruth G Hidalgo-Hernandez

(57) ABSTRACT

The disclosure provides a method for fabricating a heat pipe, and an instrument of the method. The method for fabricating a heat pipe includes providing a hollow tube, wherein the hollow tube has an open end and a closed end; disposing a mandril into the hollow tube from the open end, wherein the inside wall of the hollow tube is separated from the mandril by a space, and wherein the mandril comprises a first portion and a second portion and the first portion has a thermal expansion coefficient larger than that of the second portion; filling up the space between the mandril and the hollow tube with a powder; performing a sintering process to the hollow tube, forming a first agglomeration region and a second agglomeration region; removing the mandril; injecting a working fluid into the hollow tube; and sealing the open end of the hollow tube.

9 Claims, 4 Drawing Sheets

METHOD FOR FABRICATING A HEAT PIPE, AND INSTRUMENT OF THE METHOD

CROSS REFERENCE TO RELATED APPLICATIONS

This application is based upon and claims the benefit of priority from the prior Taiwan Patent Application No. 100129692, filed on Aug. 19, 2011, the entire contents of which are incorporated herein by reference.

BACKGROUND

1. Technical Field

The disclosure relates to a method for fabricating a heat pipe and an instrument of the method, and in particular relates to a method for fabricating a heat pipe with high heat transfer performance and an instrument of the method.

2. Related Art

Heat pipes have excellent heat transfer performance due to their low thermal resistance, and are therefore an effective means for the transfer or dissipation of heat from heat sources. Currently, heat pipes are widely used for removing heat from heat-generating components such as central processing units (CPUs) of computers.

Generally, according to the positions from which heat is input or output, the heat pipe has three sections: an evaporating section, a condensing section and an adiabatic section between the evaporating section and the condensing section. The adiabatic section is typically used for transport of the generated vapor from the evaporating section to the condensing section. When the evaporating section of a heat pipe is thermally attached to a heat-generating electronic component, the working fluid receives heat from the electronic component and evaporates. The generated vapor then moves towards the condensing section of the heat pipe under the vapor pressure gradient between the two sections. In the condensing section, the vapor is condensed to a liquid state by releasing its latent heat to, for example, a heat sink attached to the condensing section. Thus, the heat is removed away from the electronic component.

Then the condensed liquid (the working fluid has high specific heat capacity, density, and low viscosity) flows to the evaporating section along the capillary configuration of the heat pipe. This evaporating/condensing cycle repeats and since the heat pipe transfers heat so efficiently, the evaporating section is kept at or near the same temperature as the condensing section of the heat pipe. Correspondingly, the heat-transfer capability of the heat dissipation device including the heat pipe is improved greatly.

The heat transfer performance of the heat pipe depends on three major parameters: pore size between powders for forming the heat pipe, porosity of the heat pipe, and permeability of the heat pipe. Regarding a sintered heat pipe, the above parameters can be adjusted by following process conditions: geometry of the sintering powder, average pore size of the sintering powder, and the sintering period.

The evaporating section, condensing section and adiabatic section of a heat pipe respectively have specific requirements of the three major parameters. Ideally, the evaporating section of the heat pipe should have a lower particular size of sintering powder, and the condensing section and adiabatic section of the heat pipe should have a higher particular size of the sintering powder, since the evaporating section demands high capillary force for recovering the working fluid and broad evaporation area for performing a heat exchange, and the condensing section and adiabatic section demand low fluid impedance for facilitating the liquid transport.

In order to obtain a heat pipe having portions with different particular sizes of sintering powders, a conventional method employs at least two powders with different particular sizes for fabricating a heat pipe. The above method, however, leads to a low product yield and increases the process complexity, and is not suitable for mass production.

SUMMARY

An exemplary embodiment of a method for fabricating a heat pipe includes the following steps: providing a hollow tube, wherein the hollow tube has an open end and a closed end; disposing a mandril into the hollow tube from the open end, wherein the inside wall of the hollow tube is separated from the mandril by a space, and wherein the mandril comprises at least one first portion and at least one second portion and the first portion has a thermal expansion coefficient larger than that of the second portion; filling up the space between the mandril and the hollow tube with a powder; performing a sintering process to the hollow tube, forcing the powder to form at least one first agglomeration region and at least one second agglomeration region, wherein the first agglomeration region is directly contacted to the first portion and the second agglomeration region is directly contacted to the second portion during the sintering process, and wherein the thickness of the first agglomeration region is less than that of the second agglomeration region; removing the mandril after cooling; injecting a working fluid into the hollow tube; and sealing the open end of the hollow tube.

In another embodiment of the disclosure, an instrument employed by the aforementioned method is provided. The instrument for fabricating a heat pipe is a mandril, wherein the mandril comprises at least one first portion and at least one second portion, and wherein the first portion has a thermal expansion coefficient larger than that of the second portion.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
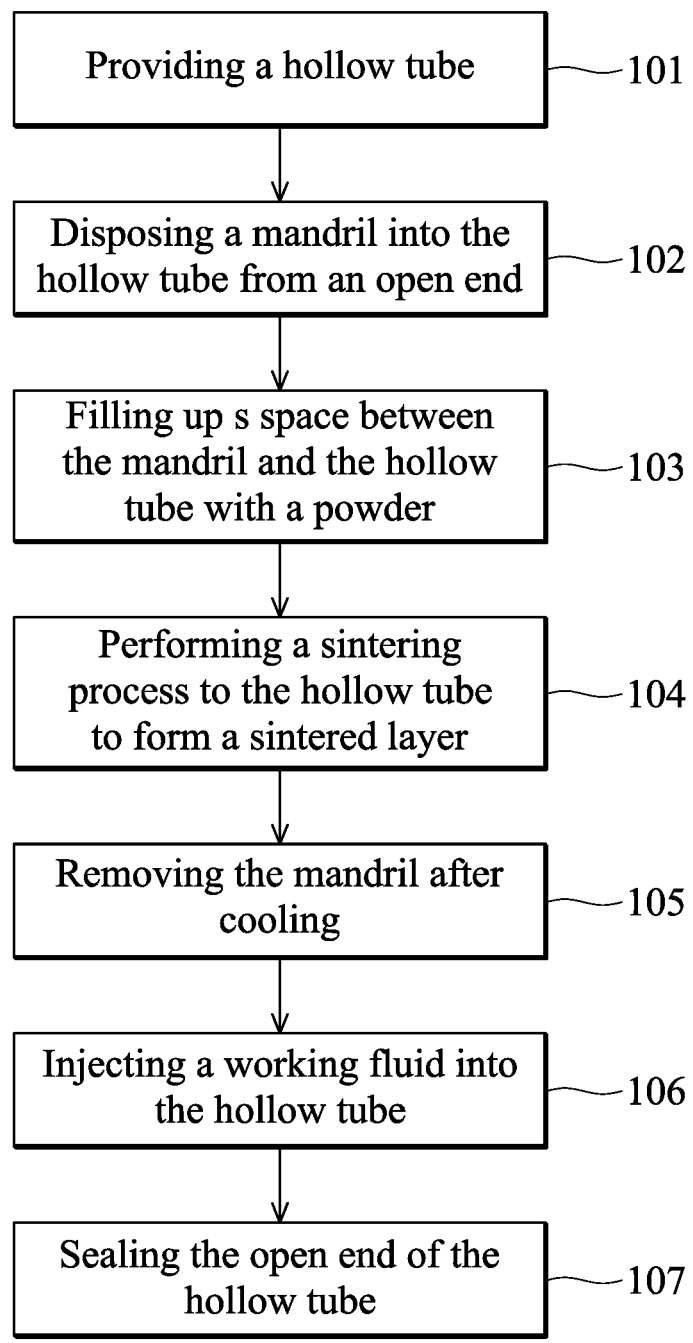
FIG. 1 shows a flow chart of a method for fabricating a heat pipe according to an embodiment of the disclosure.

The following description is of the best-contemplated mode of carrying out the disclosure. This description is made for the purpose of illustrating the general principles of the disclosure and should not be taken in a limiting sense. The scope of the disclosure is best determined by reference to the appended claims.

The disclosure provides a method for fabricating a heat pipe, and an instrument employed by the method. A key aspect of the method for fabricating a heat pipe is to use a mandril having portions with different thermal expansion coefficients. After performing a sintering process, the powder filled into the hollow tube forms a sintered layer with various thicknesses (i.e. the sintered layer exhibits various pore sizes, porosity, and permeability simultaneously). Therefore, the heat pipe can have an evaporating section with low porosity (enhancing the capillary force), and a condensing section and an adiabatic section with high porosity (improving the liquid transport), promoting the heat transfer performance of the heat pipe.

According to an embodiment of the disclosure, the method for fabricating a heat pipe includes the following steps. A hollow tube is provided, wherein the hollow tube has an open end and a closed end. A mandril is disposed into the hollow tube from the open end, wherein the inside wall of the hollow tube is separated from the mandril by a space, and wherein the mandril comprises at least one first portion and at least one second portion and the first portion has a thermal expansion coefficient larger than that of the second portion. The space between the mandril and the hollow tube is filled with a powder. A sintering process is performed to the hollow tube, forcing the powder to form at least one first agglomeration region and at least one second agglomeration region, wherein the first agglomeration region is directly contacted to the first portion and the second agglomeration region is directly contacted to the second portion during the sintering process, and wherein the thickness of the first agglomeration region is less than that of the second agglomeration region. The mandril is removed after cooling. A working fluid is injected into the hollow tube. The open end of the hollow tube is sealed.

Since the mandril has portions with different thermal expansion coefficients and the first portion with higher thermal expansion coefficient has an expansion volume higher than that of the second portion with lower thermal expansion coefficient during the sintering process, the sintered layer has various thicknesses (and/or densities). Therefore, the sintered layer can be defined as a first agglomeration region (lower thickness) and a second agglomeration region (higher thickness) for serving as an evaporating section, or condensing/adiabatic sections.

Further, the disclosure also provides an instrument employing by the above method. The instrument is a mandril, wherein the mandril comprises at least one first portion and at least one second portion, and wherein the first portion has a thermal expansion coefficient larger than that of the second portion.

The following examples are intended to illustrate the invention more fully without limiting the scope, since numerous modifications and variations will be apparent to those skilled in this art.

Figure 2:
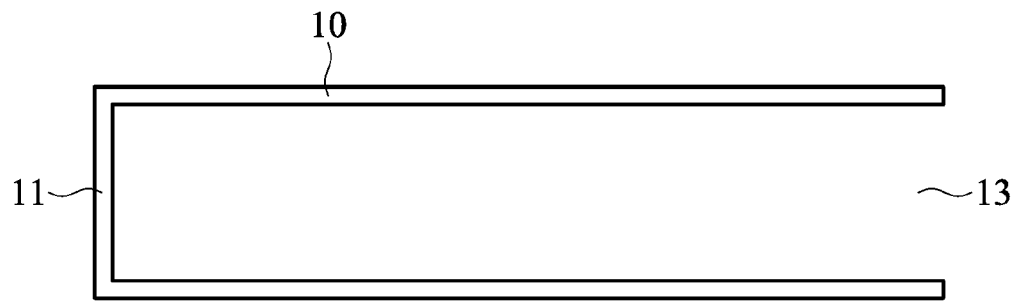
FIGS. 2-7 are a series of cross-section views showing a method for fabricating a heat pipe according to an embodiment of the disclosure.

According to an embodiment of the disclosure, the method for fabricating a heat pipe can include the following steps, as shown in FIG. 1:

First, a hollow tube 10 is provided (step 101), the hollow tube 10 has a closed end 11 and an open end 13, as shown in FIG. 2. The hollow tube 10 can be made of a metal or alloy with high thermal conductivity, such as Cu, Al, Fe, Ni, Ti, alloy thereof, or stainless steel. The outside cross-sectional shape of the hollow tube can be circular, ellipsoidal, polygonal, or combinations thereof, and the inside cross-sectional shape of the hollow tube is circular, ellipsoidal, polygonal, or combinations thereof.

Figure 3:
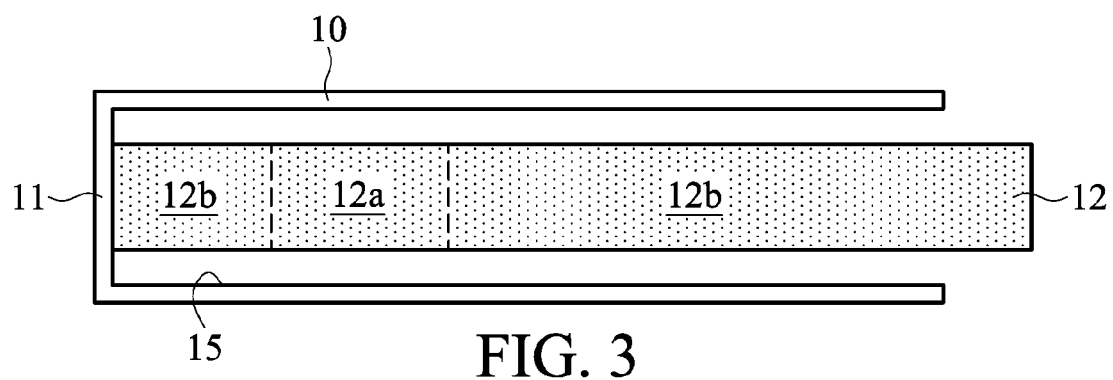

Next, a mandril 12 can be disposed into the hollow tube 10 from the open end 13, and the mandril 12 is separated from the inside wall 15 of the hollow tube 10 by a space (step 102), as shown in FIG. 3. Particularly, the mandril 12 includes a first portion 12a and a second portion 12b, and the first portion 12a has a thermal expansion coefficient larger than that of the second portion 12b.

Generally, the mandril can be made of Al, Al-containing alloy, or stainless steel. It should be noted that, in order to remove the mandril 12 in the subsequent step, the mandril 12 of the disclosure has a single cross-sectional area and a single cross-sectional shape at room temperature (such as 25° C.). The cross-sectional shape of the mandril can be circular, ellipsoidal, polygonal, or combinations thereof. A key aspect of the method for fabricating a heat pipe of the disclosure is to use a mandril 12 having portions with different thermal expansion coefficients. Due to the thermal expansion coefficient difference of the first portion 12a and the second portion 12b of the mandril 12, the expansion volume of the first portion 12a is larger than the expansion volume of the second portion 12b, resulting in a sintered layer with various thickness. Accordingly, a key aspect of the disclosure is to modify the thermal expansion coefficient difference between the first portion 12a and the second portion 12b, and will be discussed in detail below.

Figure 4:
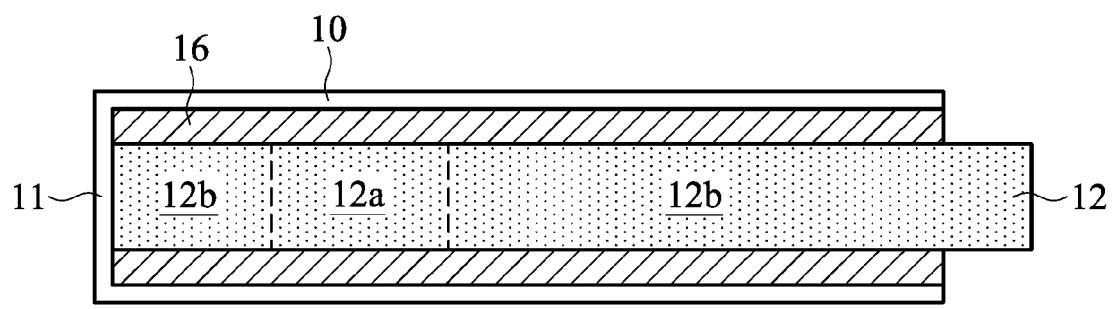

Next, a powder 16 is filled into the space 14 between the mandril 12 and the hollow tube 10 (step 103), as shown in FIG. 4. Meanwhile, the powder 16 disposed in the space 14 has a thickness T. The used powder is a single type (i.e. the powder has a single particular size), such as copper powder, titanium powder, nano carbon particle or combinations thereof.

Figure 5:
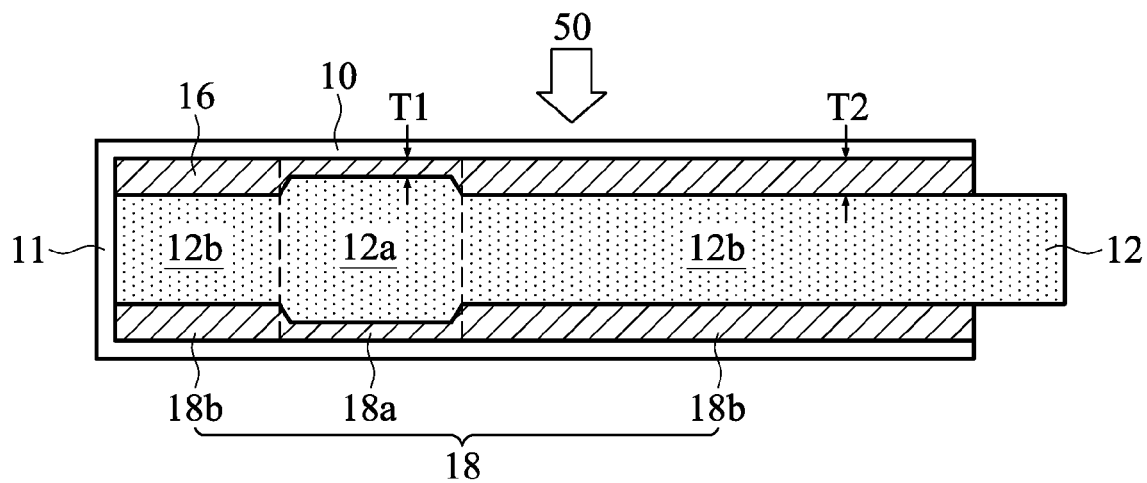

Next, the hollow tube 12 is subjected to a sintering process 50, thereby forcing the powder 16 to form a sintered layer 18 (step 104), as shown in FIG. 5. In the sintering process 50, the hollow tube 10 is sintered under a fixed sintering temperature (i.e. the whole hollow tube is sintered under the same fixed sintering temperature), and the fixed sintering temperature can be of between 900-1100° C. It should be noted that, since the first portion 12a has a thermal expansion coefficient larger than that of the second portion 12b of the mandril 12, the powder 16 adjacent to the first portion 12a receives a higher extrusion pressure during the sintering process, forming a first agglomeration region 18a with a lower thickness T1 (having a compression ratio C1 (C1=T1/T)). On the other hand, the powder 16 adjacent to the second portion 12b receives a lower extrusion pressure during the sintering process, forming a second agglomeration region 18b with a higher thickness T2 (having a compression ratio C2 (C2=T2/T))

Generally, the compression ratios C1 and C2 can be equal to or more than 0.01, preferably of between 0.1-0.9. In this embodiment, the first agglomeration region 18a can serve as an evaporating section due to the high density, and low porosity (enhancing the capillary force). Further, the second agglomeration region 18b can serve as an adiabatic section and a condensing section due to the low density, high porosity and high permeability (improving the liquid transport).

In order to form a first agglomeration region 18a with high density and a second agglomeration region 18b with low density, the mandril 12 (serving as the instrument of the method) should have a plurality of portions with different thermal expansion coefficients. The mandril 12 with various different thermal expansion coefficients can be obtained via a thermal treatment by controlling the metallographic structure and components of the mandril. For example, the mandril has a portion made of 「304」 stainless steel (serving as the first portion 12a) and another portion made of 「430」 stainless steel (serving as the second portion 12b). Substantially, the thermal expansion coefficient of the stainless steel depends on the metallographic structure. For example, 「304」 stainless steel is classified as Austenitic stainless steel, and 「430」 stainless steel is classified as Ferritic stainless steel. Austenitic stainless steel generally has a thermal expansion coefficient larger than that of Ferritic stainless steel. The 「304」 stainless steel and 「430」 stainless steel are the most widely used in industrial applications, and the 「304」 stainless steel has a thermal expansion coefficient approximately 1.5 times larger than that of the 「430」 stainless steel (「304」 stainless steel consists essentially of chromium from 18.0% to 20.0%, nickel from 8.0% to 11.0%, and carbon 0.08% in maximum, and have a thermal expansion coefficient of 18.8×10E-6 m/m-K at 982° C.; 「430」 stainless steel consists essentially of chromium from 14.0% to 18.0%, and carbon 0.12% in maximum, and have a thermal expansion coefficient of 11.9×10E-6 m/m-K at 982° C.).

The ratio between the thermal expansion coefficient of the first portion of the mandril and the thermal expansion coefficient of the second portion of the mandril can be between 1.01 and 2.00.

The selection of the thermal expansion coefficient ratio between the first and second portions depends on the thickness of the powder 16 and the applications of the obtained heat pipe. For example, when the thickness of the powder is less than 0.3 mm, the thermal expansion coefficient ratio between the first and second portions can be between 1.01 and 1.1. Further, when the thickness of the powder is less than 10 mm, the thermal expansion coefficient ratio between the first and second portions should be less than 2.00 to prevent a breakpoint from being formed at the interface between the first agglomeration region 18a and the second agglomeration region 18b. Table 1 lists the suitable materials for serving as first or second portions of the mandril of the disclosure (the first and second portions are made of stainless steel with different thermal expansion coefficients):

TABLE 1

| stainless steel | liner thermal expansion coefficient (μm/m-K) |
|---|---|
| Austenitic stainless steel 304 | 18.8 |
| Austenitic stainless steel 310 | 14.4 |
| Austenitic stainless steel 316 | 16 |
| Ferritic stainless steel 410 | 9.9 |
| Ferritic stainless steel 430 | 11.9 |

Figure 6:
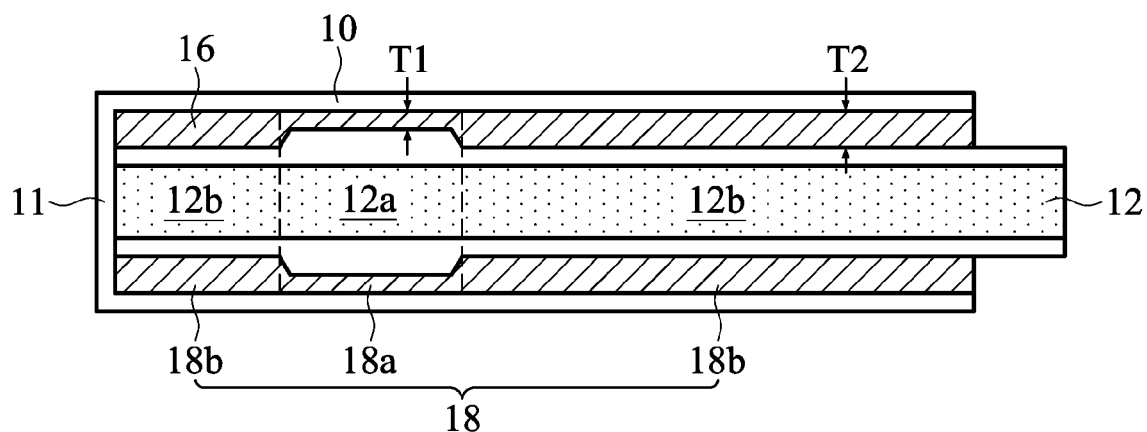
Figure 7:
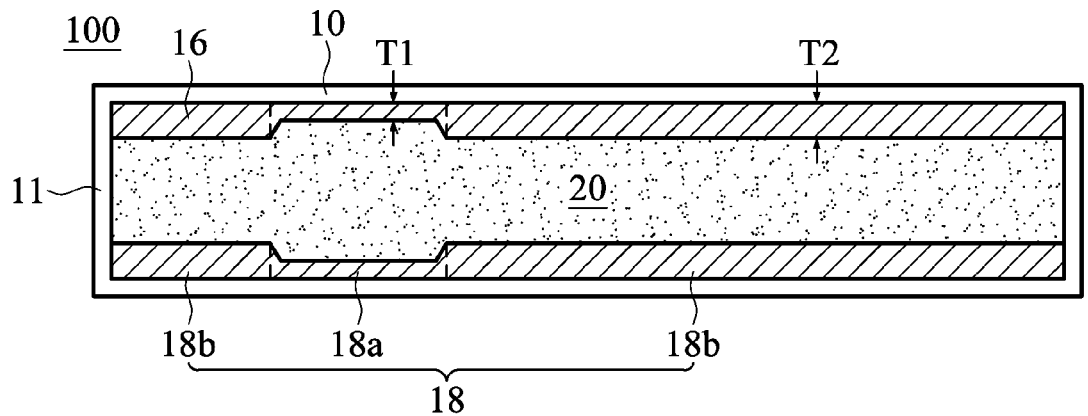

After the sintering process, the disclosure further includes the below steps:

As shown in FIG. 6, after the sintering process 50, the hollow tube is cooled down to room temperature, and then the mandril is removed (step 105). Next, a working fluid 20 is injected into the hollow tube (step 106) from the open end, and then the open end of the hollow tube is sealed (step 107), obtaining a heat pipe 100, as shown in FIG. 7. The working fluid can be water, ammonium hydroxide, methanol, acetone, heptane, or combinations thereof.

The heat pipe obtained by the aforementioned method includes a first agglomeration region 18a serving as an evaporating section due to the high density, and low porosity, and a second agglomeration region 18b serving as an adiabatic section and a condensing section due to the low density, high porosity and high permeability.

Figure 8:
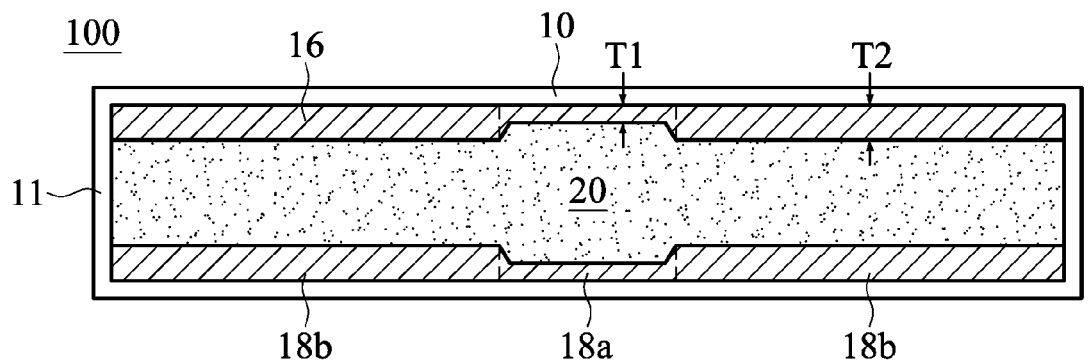
FIG. 8 is a cross-section view of a heat pipe according to another embodiment of the disclosure.
Figure 9:
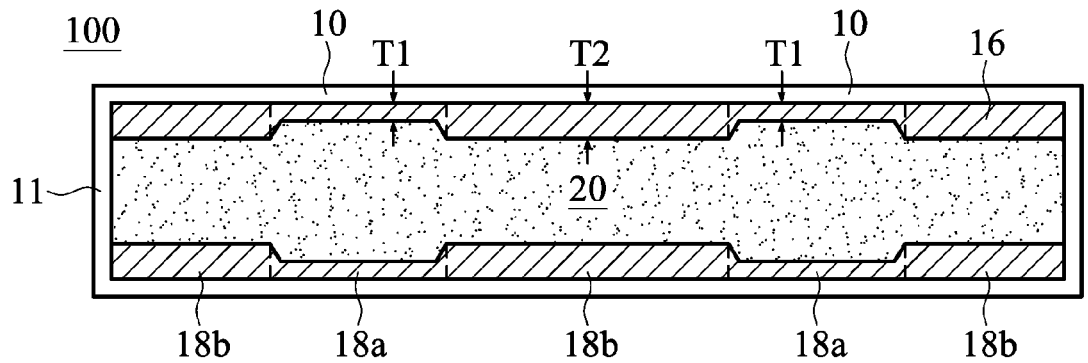
FIG. 9 is a cross-section view of a heat pipe according to yet another embodiment of the disclosure.

In general, since the evaporating section of the heat pipe 100 is used to be in contact with a heat source of an electric device, the first agglomeration region 18a can be optionally located on the central position of the heat pipe 100, except for being located on one side of the heat pipe 100, as shown in FIG. 8. Moreover, if the electric device has a plurality of heat sources, the heat pipe 100 could have a plurality of the first agglomeration region 18a serving as the evaporating section (corresponding to the heat source), as shown in FIG. 9.

Accordingly, the mandril of the disclosure having portions with different thermal expansion coefficient can be obtained via a thermal treatment to control the metallographic structure. Therefore, the method for fabricating a heat pipe employed by the aforementioned mandril can produce a heat pipe having a sintered layer with various porosities, improving the heat transfer performance. Further, since the powder used in the disclosure can have a fixed particular size, the product yield can be increased and the process complexity can be reduced.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for fabricating a heat pipe, comprising:
providing a hollow tube, wherein the hollow tube has an open end and a closed end;
disposing a mandril into the hollow tube from the open end, wherein an inside wall of the hollow tube is separated from the mandril by a space, and wherein the mandril comprises at least one first portion and at least one second portion and the first portion has a thermal expansion coefficient larger than that of the second portion;
filling up the space between the mandril and the hollow tube with a powder;
performing a sintering process to the hollow tube, forcing the powder to form at least one first agglomeration region and at least one second agglomeration region, wherein the first agglomeration region is directly contacted to the first portion and the second agglomeration region is directly contacted to the second portion during the sintering process, and wherein the thickness of the first agglomeration region is less than that of the second agglomeration region;
removing the mandril after cooling;
injecting a working fluid into the hollow tube; and
sealing the open end of the hollow tube.

2. The method as claimed in claim 1, wherein the mandril is made of a stainless steel, and wherein the ratio between the thermal expansion coefficient of the first portion and the thermal expansion coefficient of the second portion is of between 1.01-2.00.

3. The method as claimed in claim 1, wherein the hollow tube is made of Cu, Al, Fe, Ni, Ti, or alloy thereof.

4. The method as claimed in claim 1, wherein the powder comprises copper powder, titanium powder, nano carbon particle, or combinations thereof.

5. The method as claimed in claim 1, wherein the working fluid comprises water, ammonium hydroxide, methanol, acetone, heptane, or combinations thereof.

6. The method as claimed in claim 1, wherein the mandril has a single cross-sectional area and a single cross-sectional shape.

7. The method as claimed in claim 1, wherein an outside cross-sectional shape of the hollow tube is circular, ellipsoidal, polygonal, or combinations thereof.

8. The method as claimed in claim 1, wherein an inside cross-sectional shape of the hollow tube is circular, ellipsoidal, polygonal, or combinations thereof.

9. The method as claimed in claim 6, wherein the single cross-sectional shape of the mandril is circular, ellipsoidal, polygonal, or combinations thereof.

* * * * *